United States Patent
Kowalevicz et al.

(10) Patent No.: US 9,692,139 B2
(45) Date of Patent: Jun. 27, 2017

(54) METHODS AND APPARATUS FOR ORBITAL ANGULAR MOMENTUM (OAM) SYSTEM

(71) Applicant: Raytheon Company, Waltham, MA (US)

(72) Inventors: Andrew Kowalevicz, Arlington, VA (US); Gary M. Graceffo, Burke, VA (US)

(73) Assignee: Raytheon Company, Waltham, MA (US)

( * ) Notice: Subject to any disclaimer, the term of this patent is extended or adjusted under 35 U.S.C. 154(b) by 86 days.

(21) Appl. No.: 14/792,977

(22) Filed: Jul. 7, 2015

(65) Prior Publication Data
US 2017/0012732 A1    Jan. 12, 2017

(51) Int. Cl.
H04J 4/00    (2006.01)
H01Q 21/00    (2006.01)

(52) U.S. Cl.
CPC ....... *H01Q 21/00* (2013.01); *H04B 2210/006* (2013.01)

(58) Field of Classification Search
CPC .................................................. H04J 14/0298
USPC .......................................................... 398/76
See application file for complete search history.

(56) References Cited

U.S. PATENT DOCUMENTS

| | | | | |
|---|---|---|---|---|
| 8,432,884 | B1* | 4/2013 | Ashrafi | H04L 5/04 370/343 |
| 9,077,577 | B1* | 7/2015 | Ashrafi | H04L 27/362 |
| 2010/0013696 | A1* | 1/2010 | Schmitt | G01S 7/024 342/54 |
| 2012/0207470 | A1* | 8/2012 | Djordjevic | H04B 10/25 398/44 |
| 2013/0235744 | A1* | 9/2013 | Chen | H04L 47/82 370/252 |
| 2015/0146815 | A1* | 5/2015 | Berretta | H04L 27/18 375/279 |
| 2016/0043794 | A1* | 2/2016 | Ashrafi | H04B 7/0697 370/329 |

OTHER PUBLICATIONS

Gao et al.; "Generating, Multiplexing/Demultiplexing and Receiving the Orbital Angular Momentum of Radio Frequency Signals Using an Optical True Time Delay Unit;" Journal of Optics 15, IOP Publishing; Jan. 2013; pp. 1-6.
Yan et al; "High-Capacity Millimetre-Wave Communications with Orbital Angular Momentum Multiplexing;" Nature Communications, Macmillan Publishers Limited; Sep. 16, 2014; pp. 1-9.

* cited by examiner

*Primary Examiner* — Juan A Torres
(74) *Attorney, Agent, or Firm* — Daly, Crowley Mofford & Durkee, LLP

(57) ABSTRACT

Methods and apparatus for an OAM system having simultaneous OAM states. In embodiments, m data streams are encoded and split into n copies each of which is delayed to produce a distinct RF orbital angular momentum (OAM) mode. The delayed copies are combined using wave division multiplexing. The combined m data streams are transmitted using n antenna elements.

20 Claims, 18 Drawing Sheets

1

METHODS AND APPARATUS FOR ORBITAL ANGULAR MOMENTUM (OAM) SYSTEM

BACKGROUND

As is known in the art, orbital angular momentum (OAM) refers to an electromagnetic phenomenon that allows for the creation of non-planar waves. OAM states are orthogonal and allow for information to be encoded in the same space, at the same time, and on the same carrier frequency, while continuing to be non-interfering. Conventional systems to generate OAM RF signals include triaxial and vivaldi antennas, as well as by phase plate use.

SUMMARY

In embodiments, an OAM system provides arbitrary and simultaneous orbital angular momentum (OAM) states for generating non-planar waveforms with multiple orthogonal signals. In general, embodiments of the invention can be implemented in the optical and electrical domains. While reference is made to a distinct OAM RF mode, it is understood that it could be the same OAM RF mode as long as the RF carrier frequencies on the same OAM RF mode are different. The data could be put on the same RF frequency but different OAM modes, but the same system could allow different RF carriers to be combined in the same OAM mode. In general, m refers to a number of data channels, also number of wavelengths, and also the number of created OAM RF modes, n refers to a number of copies of each data channel, also the number of send and receive antenna elements, and 2n+1 refers to a total number of OAM RF modes −n to n supported by n elements.

In an optical domain embodiment, an OAM RF system includes a number of distinct laser wavelengths (m) for modulating data streams onto each of the optical carriers. In one embodiment, modulations use the same RF carrier frequency. In other embodiments, different RF carrier frequencies are used to allow multiplexing any practical number of channels onto a single OAM RF mode. Each data channel is then optically split into n different copies, where n corresponds to the total number of antenna elements. Each of the copies is then delayed by some amount of time to produce a distinct OAM RF mode. The delay elements can be static in order to always encode a given wavelength onto a given OAM RF mode, or variable, in order to allow dynamically re-assigning data to a different OAM RF mode. A copy (with appropriate delay) from each data channel is sent to a different wavelength division multiplexer (WDM), which combines all m wavelengths into a single fiber. Each WDM element feeds the fiber to a distinct photodiode (PD), which performs an optical to electrical conversion process that removes the optical carrier and generates an RF signal with combined data from each channel. Each of the n distinct RF signals is transmitted by a different antenna element. Collectively, the output of the antenna is a superposition of the data streams onto a single RF carrier frequency, but on m different OAM RF modes. In general, there can be a total of 2n+1 modes generated from an n-element array with properly selected delays. In one embodiment, a circular array of antenna elements is used. It is understood that any suitable array configuration can be used, such as square, collection of concentric circles, etc. It is understood that concentric circles can allow for control of divergence.

Embodiments of the invention in the optical domain optically generate OAM RF signals in which the optical signals are immune from RF interference and can be sent to remote antennas with relatively low loss. In addition, modulators allow for a wide variety of RF carrier frequencies to be generated without a change in hardware. Further, optical bandwidth is significant and allows for numerous data streams to be generated and combined on the same RF carrier frequency. Also, optical delay control is more precise than RF delay control and can be performed quickly without additional losses. The precise delay and optically generated OAM RF signals can compensate for tolerances on the element placement to optimize beam shape. The OAM RF modes can be static, which allow for one optical wavelength to always associate with a given OAM RF mode. Alternatively, the OAM RF modes can be dynamic (variable delay), which allows for modification of the OAM RF transmission modes in real time.

The carrier frequency, modulation format, as well as OAM RF mode for a given channel can be changed without affecting any other channel. In addition, the large number of wavelength channels allow for a large number of OAM RF modes to be generated simultaneously, as long as there are sufficient antenna elements to support the modes. In general, there 2n+1 modes can be generated from n elements. By adding additional switching elements between the WDM combiner and PDs, the antenna can allow for different beam divergences to optimize transmission to the desired receiver In one aspect of the invention, a method comprises: encoding m data streams; splitting each of the m data streams into n copies; delaying each of the n copies by a respective amount of time to produce a distinct RF orbital angular momentum (OAM) mode; combining the delayed copies of each of the m data streams using wave division multiplexing; and transmitting the combined m data streams using n antenna elements;

The method can further include one or more of the following features: the m data streams are encoded in the optical domain, the encoded data streams are split in the optical domain, the delayed copies of the m data streams are combined in the optical domain, converting the combined delayed copies of the m data streams from the optical domain to the electrical domain, using photodiodes for the conversion from the optical domain, the antenna elements comprise a circular configuration, using the same carrier frequency for each of the OAM RF modes, using different carrier frequencies for different one of the OAM RF modes, and/or using variable delays for the n copies of the m data streams.

In another aspect of the invention, a system comprises: modulators to encode m data streams; optical splitters to split each of the m data streams into n copies; delay modules for each of the m optical splitters to delay each of the n copies by a respective amount of time to produce m distinct RF orbital angular momentum (OAM) modes; WDM combiners to combine each of the distinct OAM RF mode signals; and antenna elements to transmit the distinct OAM RF mode signals.

The system can further including one or more of the following features: the m data streams are encoded in the optical domain, the encoded data streams are split in the optical domain, the delayed copies of the m data streams are combined in the optical domain, the combined delayed copies of the m data streams are converted from the optical domain to the electrical domain, the antenna elements comprise a circular configuration, using the same carrier frequency for each of the OAM RF modes, using different carrier frequencies for different one of the OAM RF modes, and/or using variable delays for the n copies of the m data streams.

In a further aspect of the invention, a method comprises: splitting m modulated data streams into n copies each of which is delayed a respective amount to form n distinct OAM RF mode signals; combining the OAM RF signals at respective combiners; and transmitting the m distinct OAM RF signals into free space.

The method can further include one or more of the following features: the m data streams are encoded in the optical domain, the encoded data streams are split in the optical domain, the delayed copies of the m data streams are combined in the optical domain, converting the combined delayed copies of the m data streams from the optical domain to the electrical domain, using photodiodes for the conversion from the optical domain, the antenna elements comprise a circular configuration, using the same carrier frequency for each of the OAM RF modes, using different carrier frequencies for different one of the OAM RF modes, and/or using variable delays for the n copies of the m data streams.

BRIEF DESCRIPTION OF THE DRAWINGS

The foregoing features of this invention, as well as the invention itself, may be more fully understood from the following description of the drawings in which.

DETAILED DESCRIPTION

Figure 1:
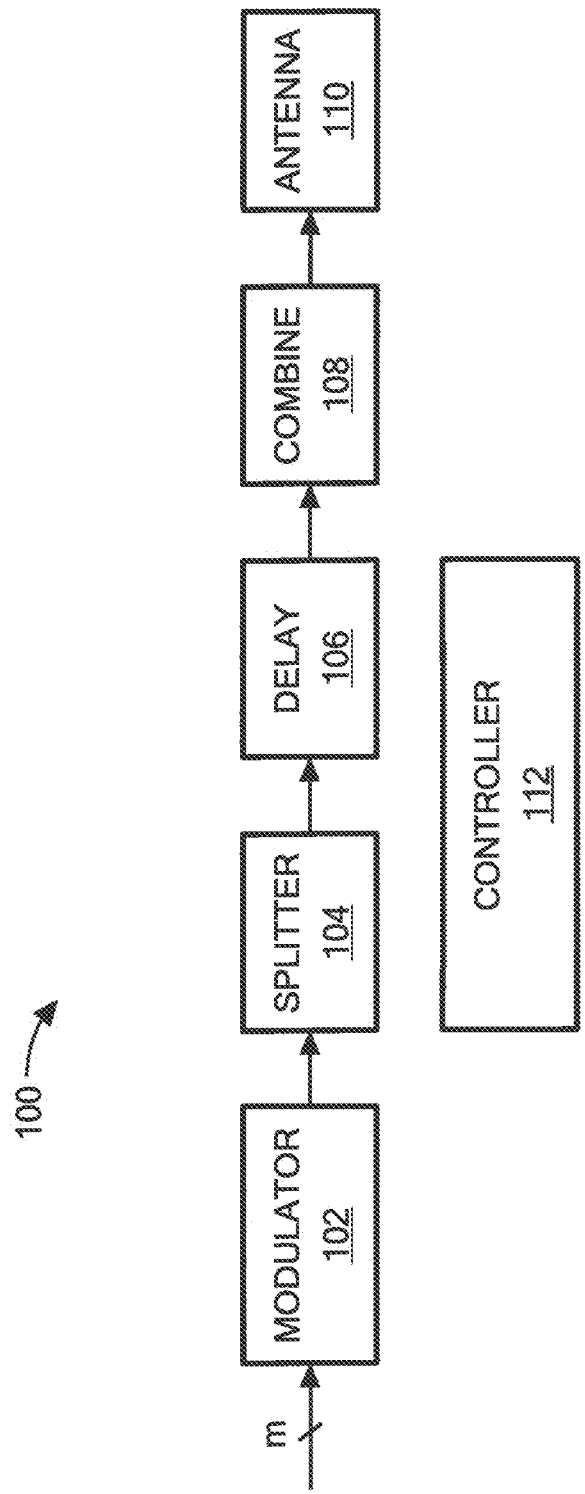
FIG. 1 is a high level schematic representation of a system to transmit orthogonal OAM RF mode signals.

FIG. 1 is a high level block diagram of a system 100 for encoding m data streams with a modulation system 102 to generate n copies of each of the encoded signals using a splitter system 104. Copies of the encoded signals are delayed in a delay system 106 by respective amounts of time to create n orthogonal orbital angular momentum (OAM) mode signals that are combined in a combiner system 108. The n combined signals are transmitted via an antenna 110 having n elements. It is understood that OAM modes are created for RF transmission by the antenna elements. A controller 112 can control overall operation of the system and perform processing to modify parameters, as described below The orthogonal OAM RF mode signals are transmitted by the multi-element antenna 110 to produce a wave-front that is non-planar. That is, multiple waveforms that are orthogonal to each other are transmitted by the antenna to significantly increase the amount of data that is transmitted in comparison to conventional systems that use planar waveforms. Note that the antenna can also create OAM Mode 0, which is still orthogonal to the other modes. It is understood that OAM Mode 0 is the plane wave that is commonly referred to. In other words, the antenna produces OAM RF modes −n to n, (2n+1 total), where n is the number of elements. The system 100 can be implemented in the optical or electrical domain.

Figure 2A:
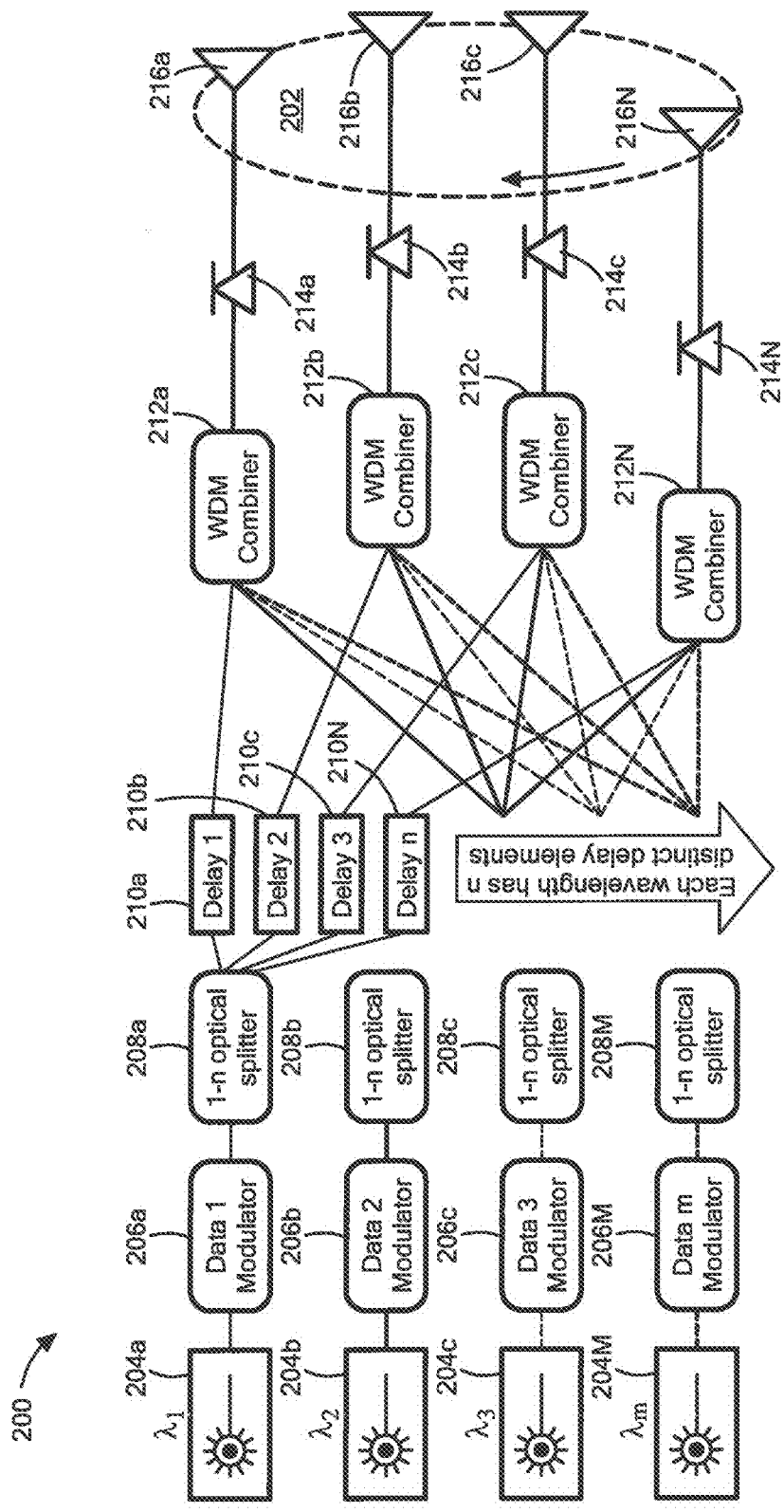
FIG. 2A is a schematic representation of a system to generate OAM RF mode signals in the optical domain.

FIG. 2A shows an optical domain illustrative orbital angular momentum (OAM) RF system 200 having an RF antenna array 202 with arbitrary and simultaneous orbital angular momentum states. A number of optical data streams 204a-M having distinct wavelengths λa-M are provided to respective data modulator modules 206a-M. In embodiments, the data modulator modules 206 use the same RF carrier frequency. In other embodiments, different RF carrier frequencies are used to allow multiplexing a number of channels onto a single OAM RF mode.

Outputs of the data modulator modules 206 are respective optical splitters 208a-M each of which provides n outputs (1-n splitter), one for each antenna element. Each of the splitter outputs 208 are coupled to a respective delay module 210a-N, where n is the total number of antenna elements. The delay modules 210 delayed the copied signal by some selected amount of time produce a distinct OAM RF mode. In one embodiment, the delay for each delay module 210 is static to encode a given wavelength onto a given OAM RF mode. In another embodiment, the delays are variable to allow dynamically re-assigning data to different OAM RF modes.

The outputs from the delay modules 210 are coupled to wave division multiplexer (WDM) modules 212a-N so that each WDM module receives the delay module 210 outputs for each of the optical data streams 204. One copy (with appropriate delay) from each data channel 204 is sent to a different WDM module 212, which combines the received wavelengths into a single fiber. The WDM module combines the data streams with delays for each of the n elements. Each WDM module 212 feeds the fiber to a converter 214a-N, such as a distinct photodiode (PD), which performs an optical to electrical conversion process that removes the optical carrier and generates an RF signal with combined data from each data channel. Each of the n distinct RF signals is transmitted by a different antenna element 216a-N.

Collectively, the output of the antenna array 216 is a superposition of the data streams onto a single RF carrier frequency, but on m different OAM modes. In general, there can be a total of 2n+1 modes generated from an n-element array for properly selected delays. The antenna transmits the m data streams on the same carrier frequency but different orthogonal OAM RF modes, which are determined by the selected delays. In other embodiments, different RF carrier frequencies can be transmitted on the same OAM RF mode. It is understood that the optical wavelength for each data channel must be distinct.

In one embodiment, array of antenna elements 216 has a circular configuration. In general, the array antenna can have any suitable configuration including square, concentric circles, and the like.

Figure 2B:
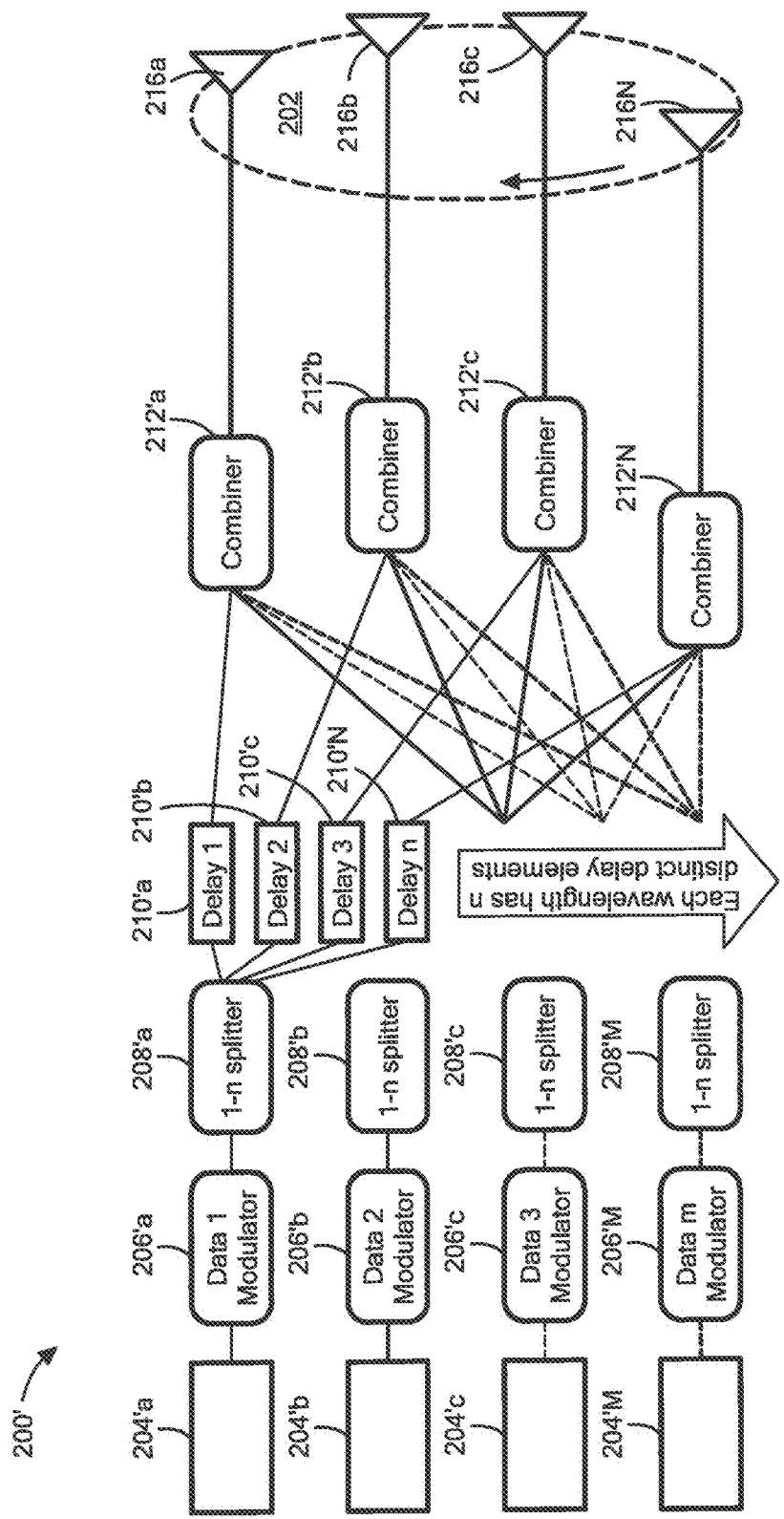
FIG. 2B is a schematic representation of a system to generate OAM RF mode signals in the electrical domain.

FIG. 2B shows an electromagnetic domain illustrative orbital angular momentum (OAM) system 200' having an RF antenna array 202 with arbitrary and simultaneous orbital angular momentum states. In general, the data streams can be split in the optical or electrical domain, and/or be combined (multiplexed) back together in the optical or electrical domain. Signal generators 204'a-M provide signals that are modulated 206', split 208', and delayed 210', in the electrical domain in manner similar to that described above. Respective multiplexer devices 212' can combine the OAM RF mode signals for transmission by the antenna elements 216. The delay modules 210', if properly selected, generate OAM RF modes once the data streams are launched into free-space by their respective n antenna elements. It is understood that OAM modes can exist in optical signals (light) in free space, but antenna embodiments described herein generate the RF equivalent.

Figure 2C:
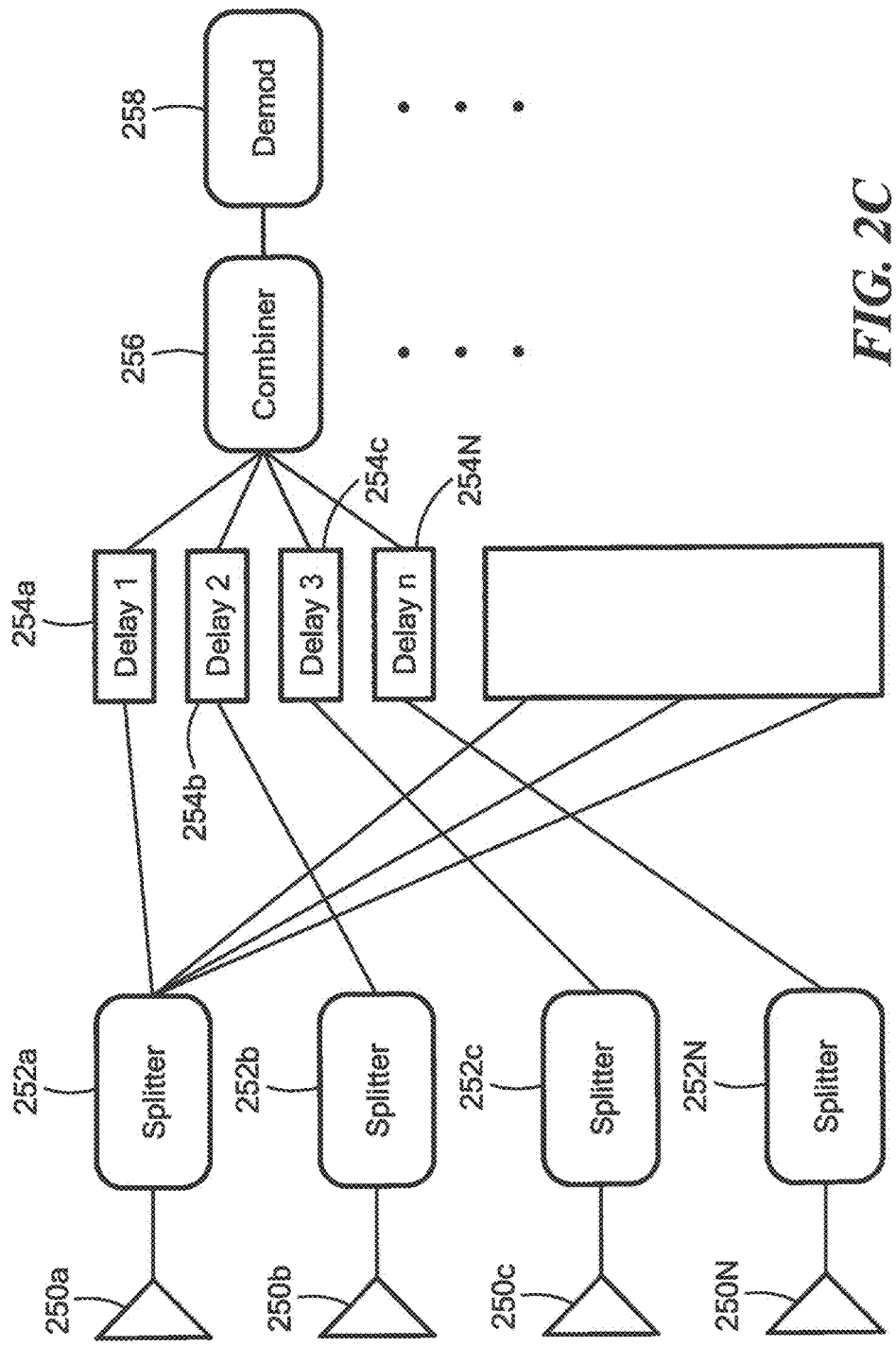
FIG. 2C is a high level schematic representation of a system to receive orthogonal OAM RF mode signals.

FIG. 2C shows a receiver to receive and process the transmitted OAM RF signals. In general, the receive process is similar to the reverse of the transmit process described above. The receiver comprises n antenna elements 250a-N for a transmit antenna having n elements. The antenna elements are coupled to 1-N splitter 252 (RF domain) which provides outputs to a respective delay element 254a-N for each of the OAM RF channels 1-M. The delay elements 254 for a given channel are coupled to a N-1 combiner 256, which is coupled to a demodulator 258 that outputs the decoded data.

In general, the beam emitted by the antenna should be well collimated to achieve the maximum effective distance. To enhance collimation, a fine gradation is desired to maximize a linear phase shift across an integer $2\pi$ rotation about a major axis of the array. It is understood that having concentric emitters and phasing each circle differently (constant phase offset from one ring to the next) may improve effective distance. In one embodiment, a circular antenna array is used to emit in a direction parallel to surface of the earth. Electrical dipoles can be used to approximate a point source. In illustrative embodiments described herein, fifteen antenna elements are used at 10 GHz. It is understood that any practical number of antenna elements and channels can be used, as well as any practical frequency. In general, any RF frequency from MHz to THz can be used.

Figure 3:
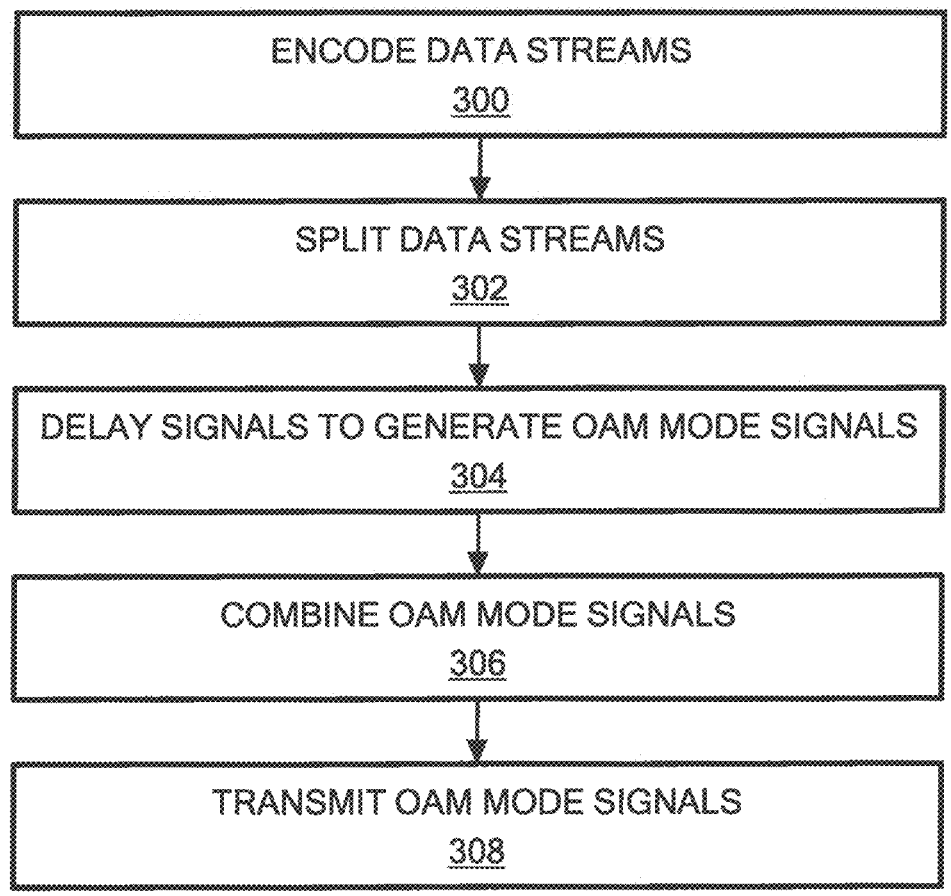
FIG. 3 is a flow diagram for transmitting orthogonal OAM RF signals.

FIG. 3 shows an illustrative sequence of steps for providing OAM signal generation. In step 300, a number of data streams are encoded in the optical or electromagnetic domain. In step 302, the encoded data streams are split into n copies, and in step 304, a copy of each stream is provided to a combiner in step 306 to provide each of the orthogonal OAM RF mode signals. In step 308, the OAM RF signals are transmitted by an antenna having n array elements.

Figures 4A, 4B, 4C:
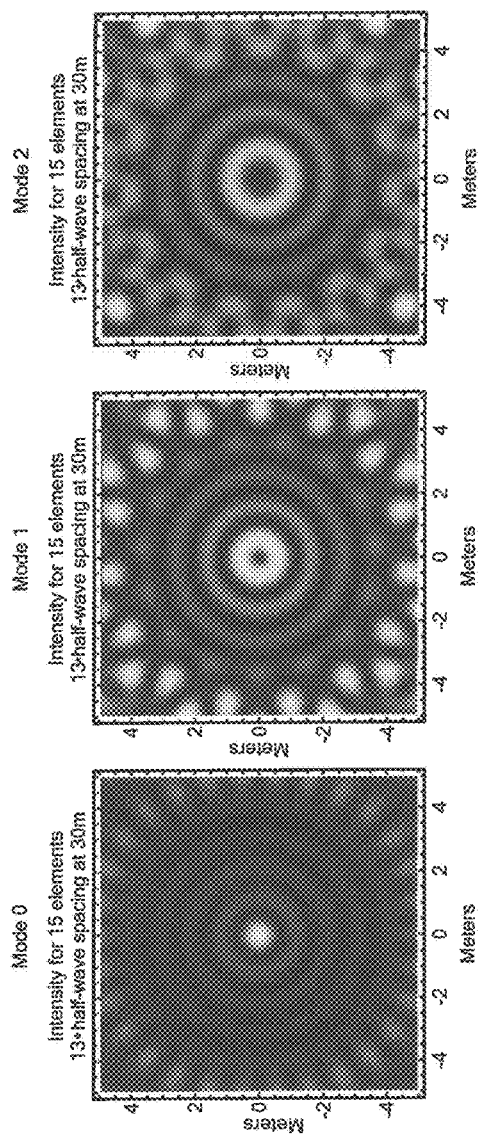
FIGS. 4A-C shows intensity patterns for an OAM RF system for Mode 0, 1, 2, respectively.

FIGS. 4A-C show illustrative intensity patterns for Mode 0 (4A), 1 (4B), and 2 (4C). As can be seen, Mode 0 has energy centered along the major axis while Modes 1 and 2 have a vortex at the center of the pattern that increases in size as the mode number increases.

Figure 5A:
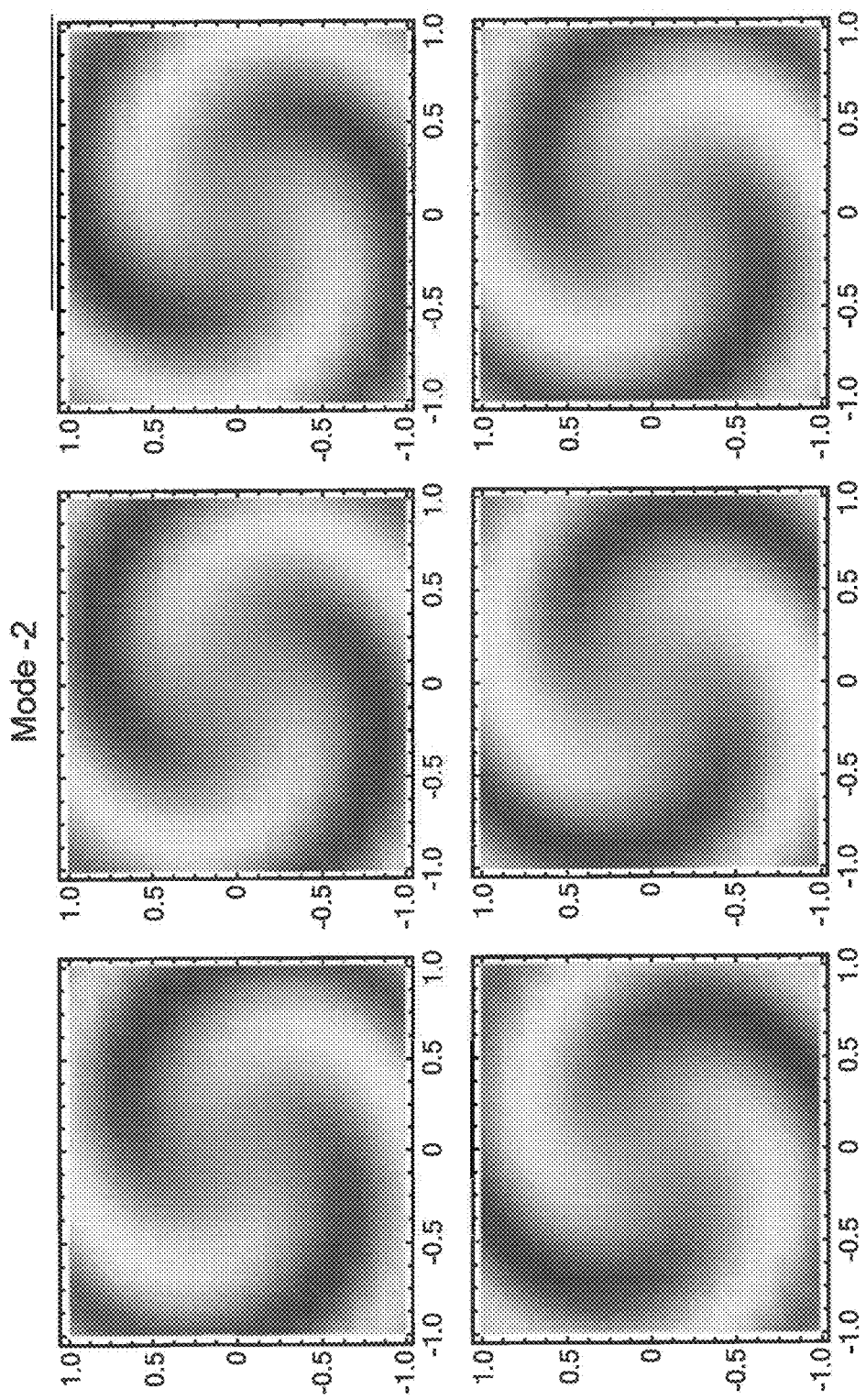
FIGS. 5A-E show wave phase front rotation as a function of Mode −2, −1, 0, 1, 2, respectively.
Figure 5B:
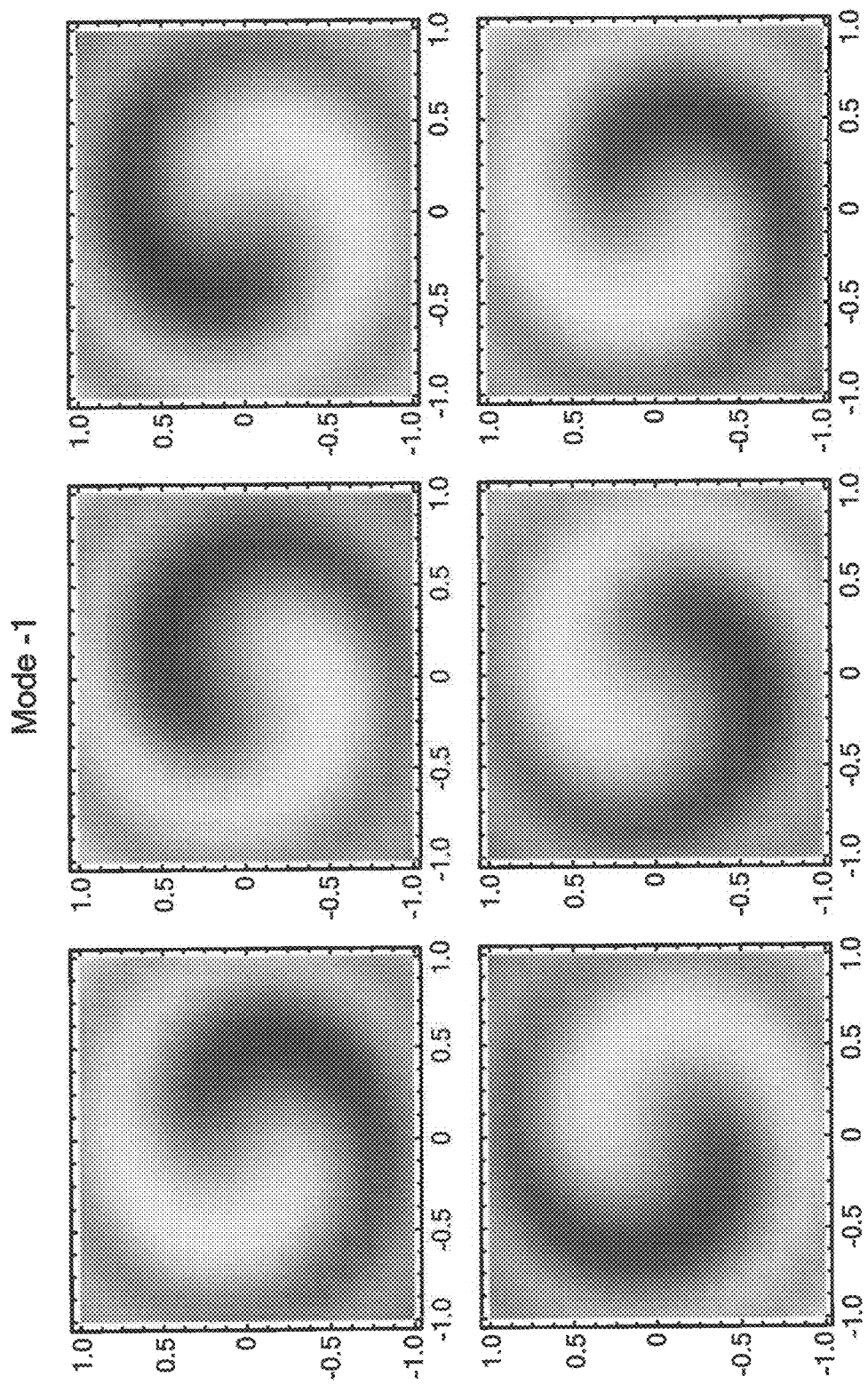
Figure 5C:
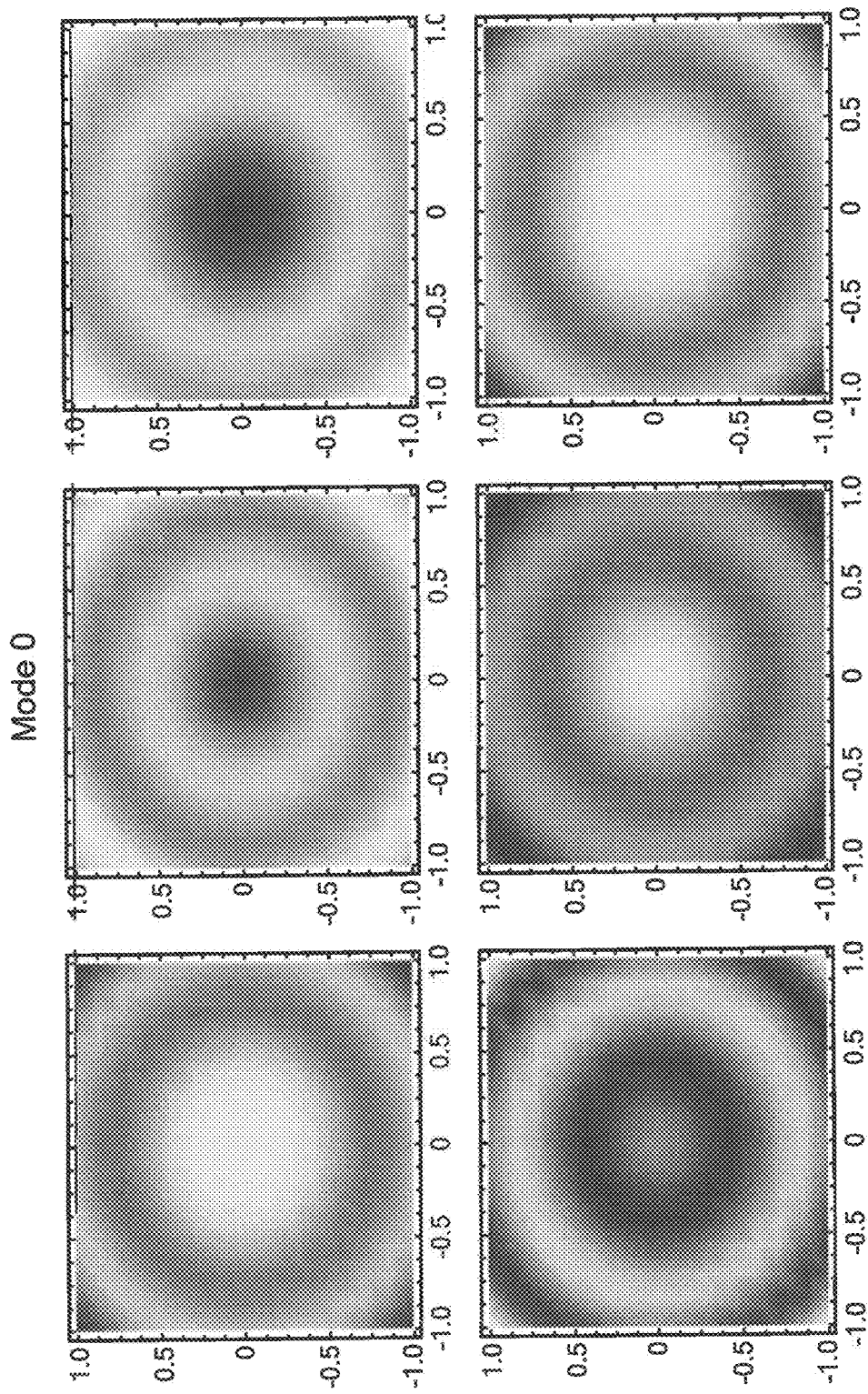
Figure 5D:
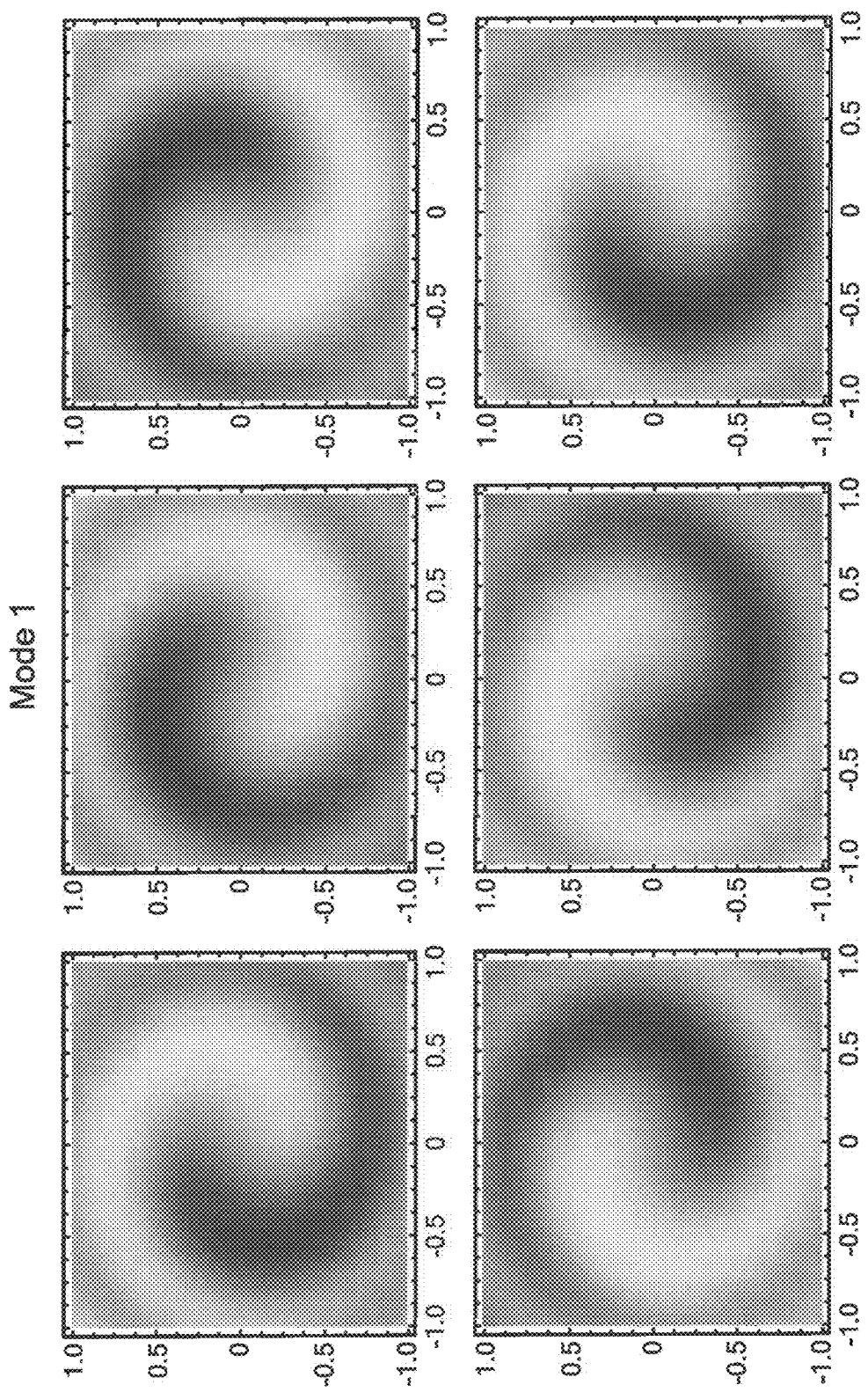
Figure 5E:
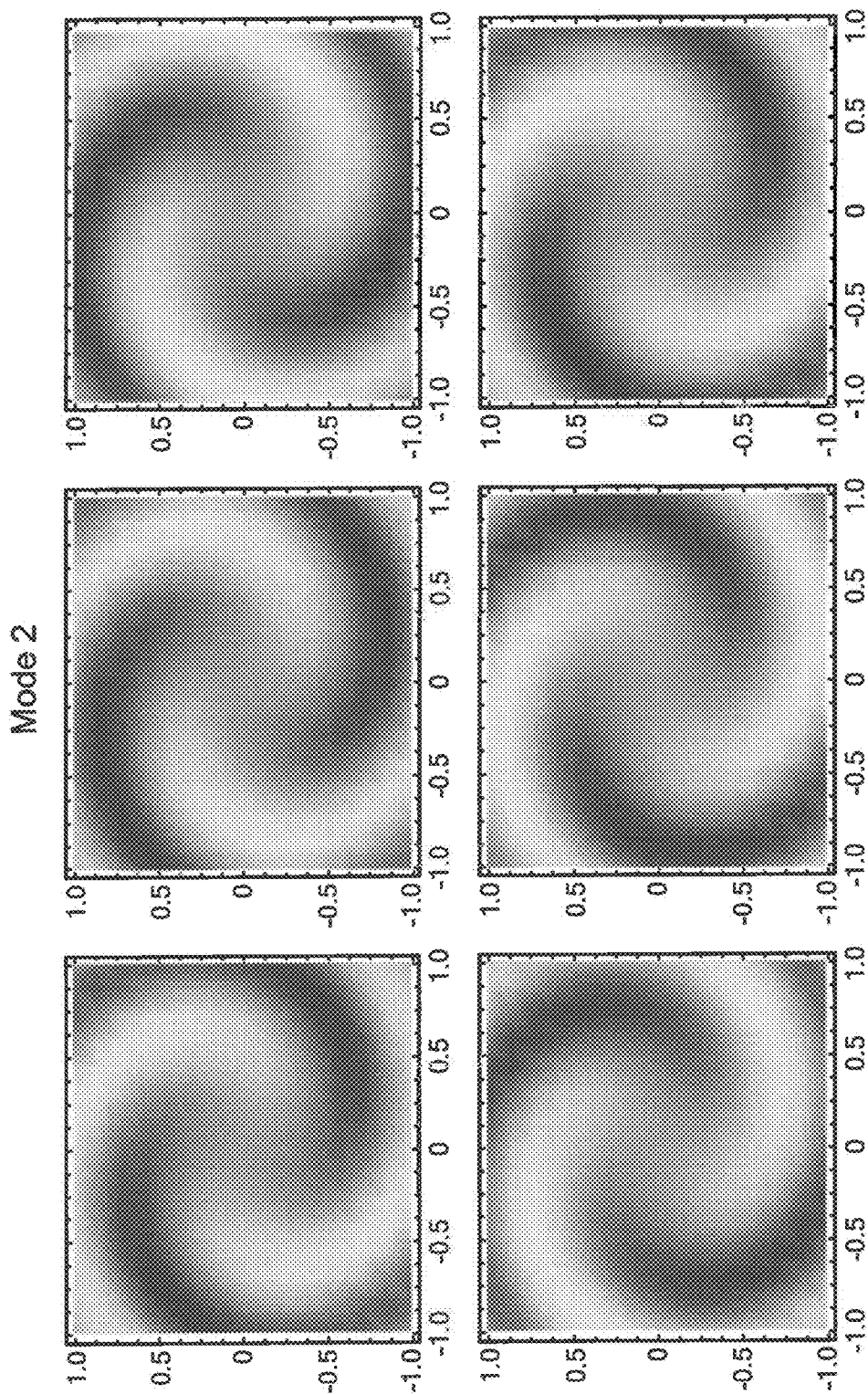

FIGS. 5A-E show respective phase front rotation as a function of Mode number. FIG. 5A shows Mode −2, FIG. 5B shows Mode −1, FIG. 5C shows Mode 0, FIG. 5D shows Mode 1, and FIG. 5E shows Mode 2.

Figure 6:
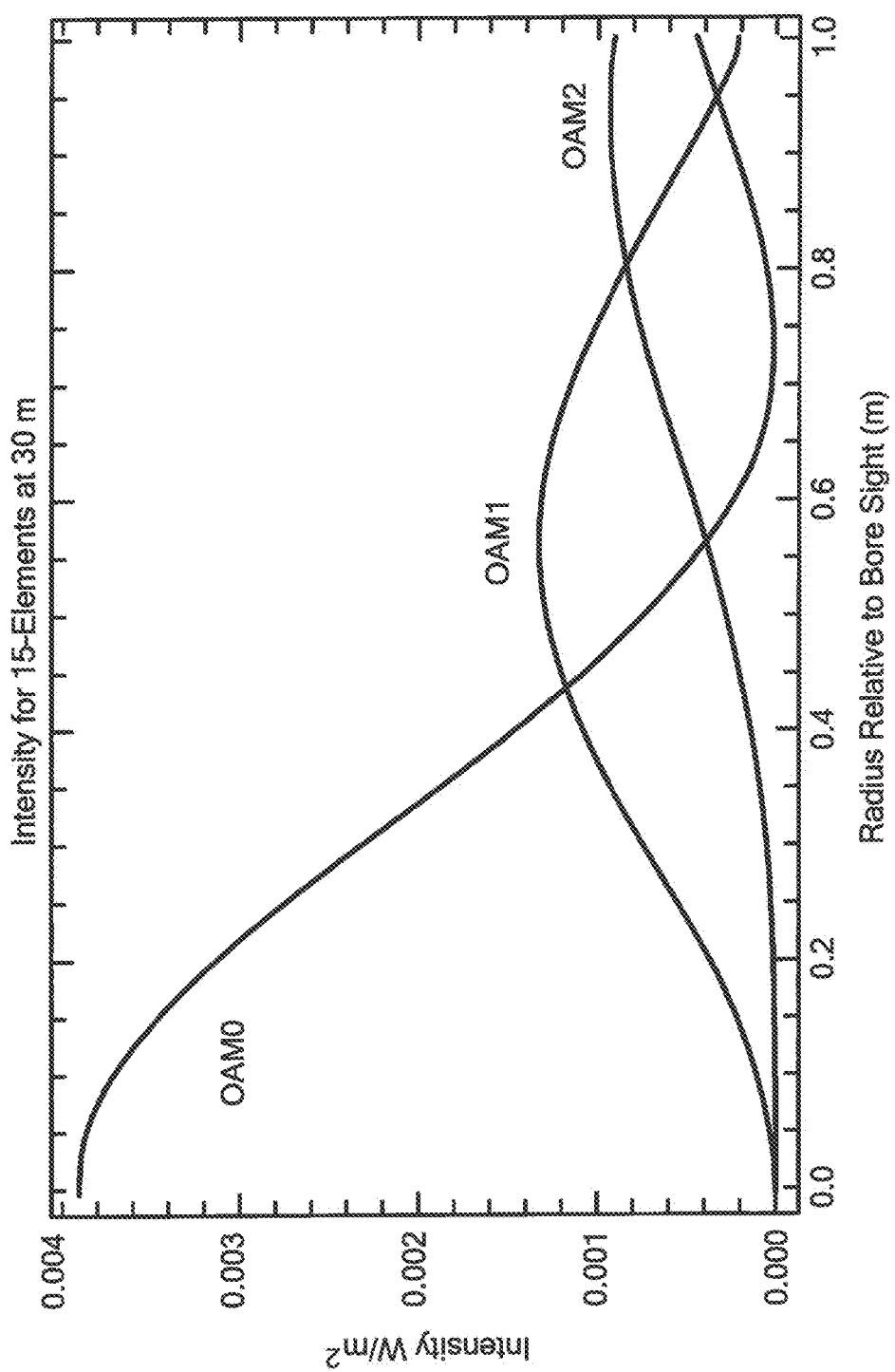
FIG. 6 shows E-field intensity on a plane thirty meters from an illustrative OAM RF system for Mode 0, 1, 2.

FIG. 6 shows an illustrative E-field intensity projected on a plane 30 meters from the transmitting antenna and normal to the poynting vector. As can be seen, at boresight (0,0), only OAM RF Mode 0 has a non-zero field. Modes 1 and 2 increase away from boresight.

Figure 7A:
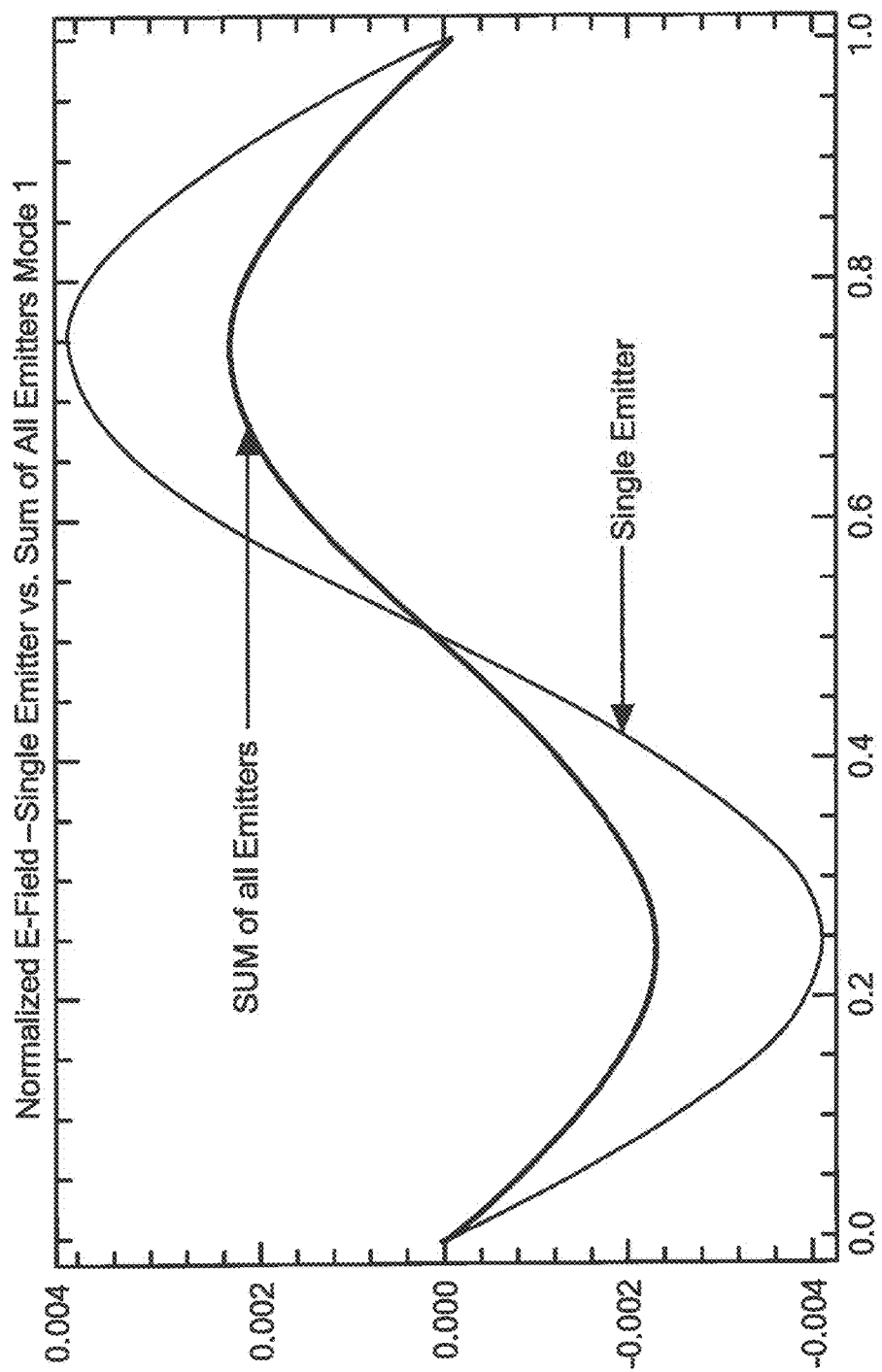
FIGS. 7A-C show Mode 1 emitter patterns and FIGS. 7D and 7E shows emitters summed in FIGS. 7A-C.
Figure 7B:
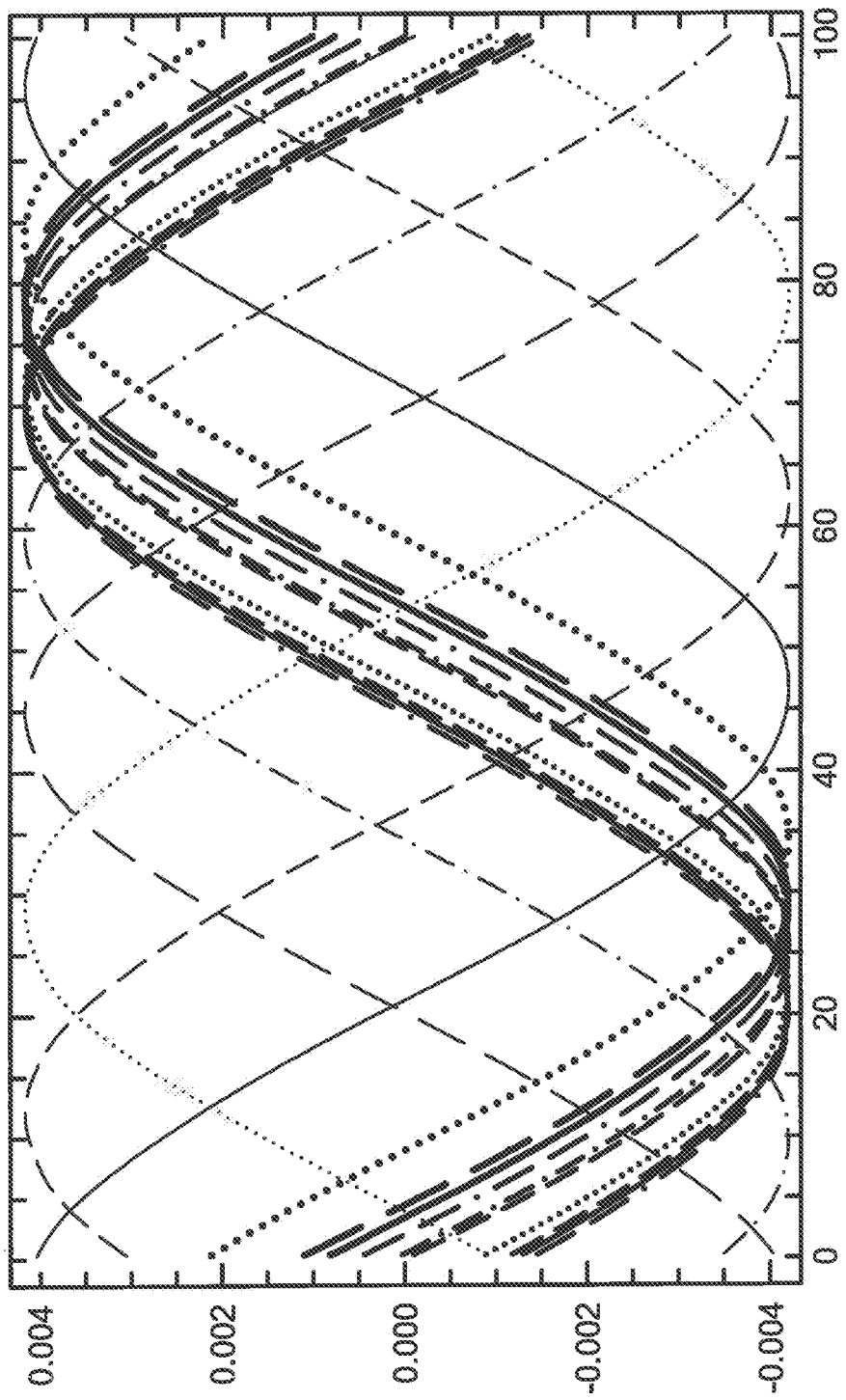
Figure 7C:
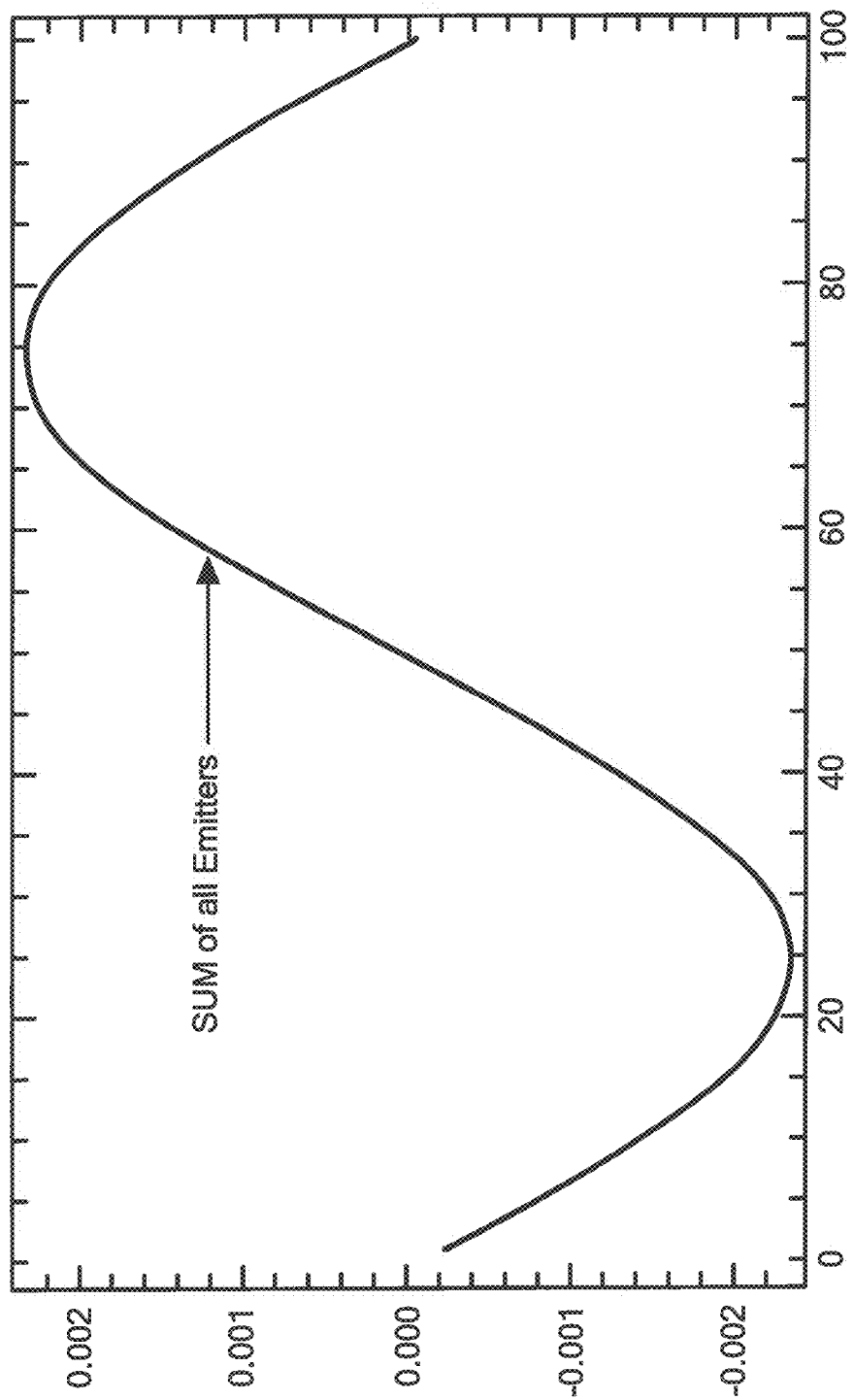

FIGS. 7A-C show Mode 1 relative phase validation and summation. FIG. 7A shows a single-emitter element to single-receiver-element pattern compared to the sum of all emitters at the same receiver element in the receiver array. FIG. 7B shows each of the 15 single-emitter-elements with proper phase for OAM RF Mode 1, as measured by the same single-receiver-element. FIG. 7C shows the output of the fifteen emitters from FIG. 7B summed together, which is the same result as shown in FIG. 7A (sum of emitters).

Figure 7D:
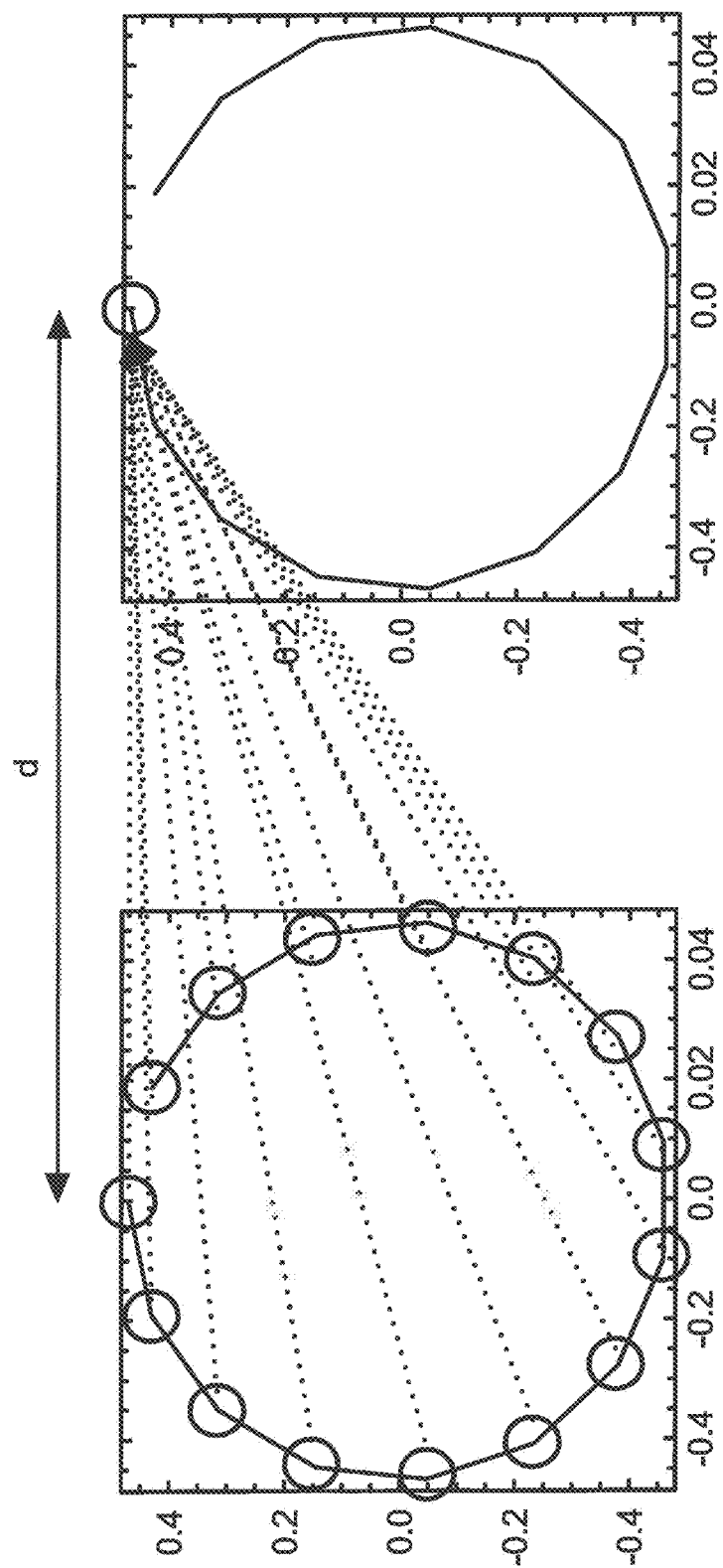
Figure 7E:
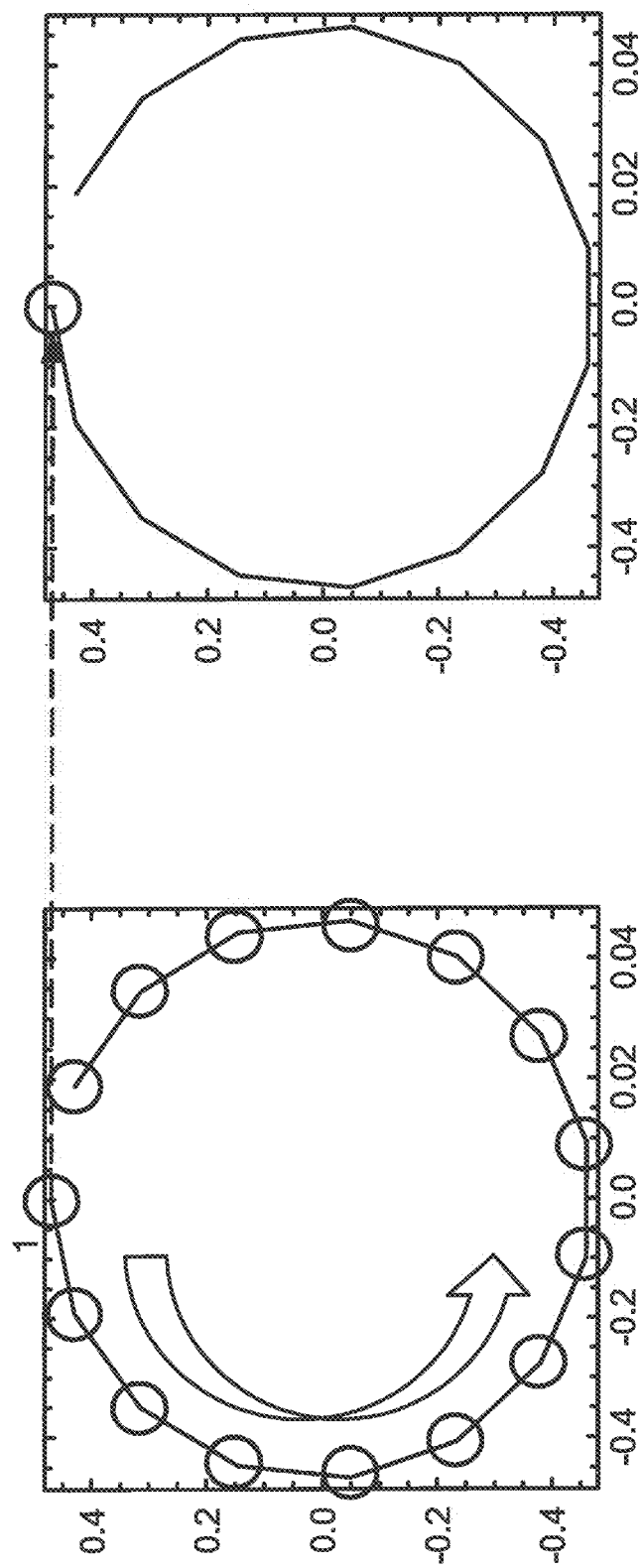

FIGS. 7D and 7E show an illustrative implementation for the emitter summing of FIGS. 7A-C with a 30 m antenna separation distance d. FIG. 7D shows summing the e-field of all emitters simultaneously at a receive element corresponding to the sum of all emitters in FIG. 7A. FIG. 7E shows elements around the array for the individual element contributions shown in FIG. 7B.

It is understood that embodiments of the invention are applicable to a wide range of applications including wireless communication, cell tower communication, commercially secure data over air, wifi communication, vehicle communication, satellite communication, and the like.

Figure 8:
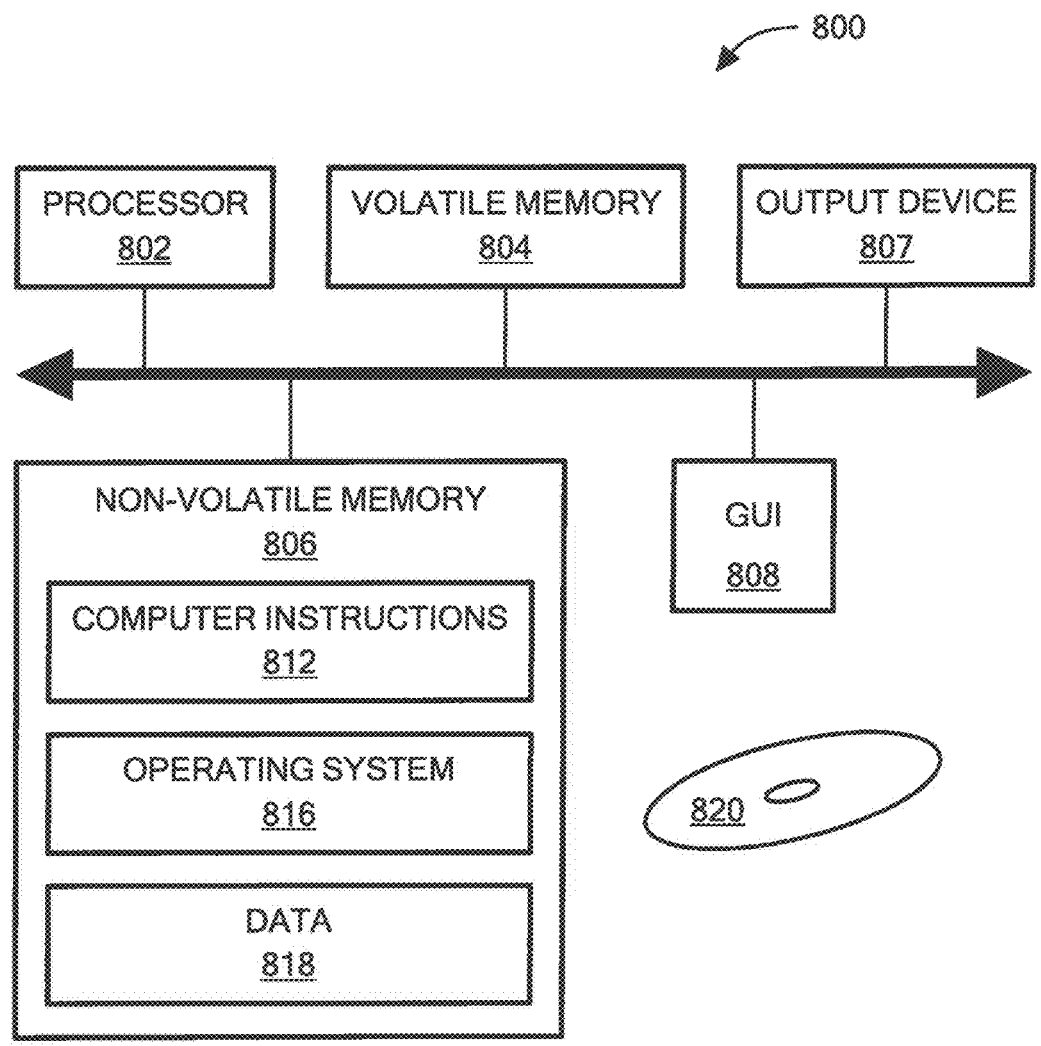
FIG. 8 is a schematic representation to show an illustrative computer that can perform at least a portion of the processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
    encoding m data streams using modulators;
    splitting each of the m encoded data streams into n copies;
    delaying each of the n copies by a respective amount of time to produce a distinct radio frequency (RF) orbital angular momentum (OAM) mode;
    combining the delayed copies of each of the m data streams using wavelength division multiplexers; and
    transmitting the combined m data streams using n antenna elements.

2. The method according to claim 1, wherein the m data streams are encoded in the optical domain.

3. The method according to claim 1, wherein the encoded data streams are split in the optical domain.

4. The method according to claim 1, wherein the delayed copies of the m encoded data streams are combined in the optical domain.

5. The method according to claim 1, further including converting the combined delayed copies of the m encoded data streams from the optical domain to the electrical domain.

6. The method according to claim 1, wherein the antenna elements comprise a circular configuration.

7. The method according to claim 1, further including using the same carrier frequency for each of the OAM modes.

8. The method according to claim 1, further including using different carrier frequencies for different one of the OAM modes.

9. The method according to claim 1, further including using variable delays for the n copies of the m encoded data streams.

10. The method according to claim 5, further including using photodiodes for the conversion from the optical domain.

11. A system, comprising:
    modulators to encode m data streams;
    optical splitters to split each of the m encoded data streams into n copies;
    delay modules for each of the m optical splitters to delay each of the n copies by a respective amount of time to produce n distinct radio frequency (RF) orbital angular momentum (OAM) modes;
    wavelength division multiplexer (WDM) combiners to combine each of the distinct OAM mode signals; and
    antenna elements to transmit the distinct OAM mode signals.

12. The system according to claim 11, wherein the m data streams are encoded in the optical domain.

13. The system according to claim 11, wherein the encoded data streams are split in the optical domain.

14. The system according to claim 11, wherein the delayed copies of the m encoded data streams are combined in the optical domain.

15. The system according to claim 11, wherein the combined delayed copies of the m encoded data streams are converted from the optical domain to the electrical domain.

16. The system according to claim 11, wherein the antenna elements comprise a circular configuration.

17. The system according to claim 11, further including using the same carrier frequency for each of the OAM modes.

18. The system according to claim 11, further including using different carrier frequencies for different one of the OAM modes.

19. The system according to claim 11, further including using variable delays for the n copies of the m encoded data streams.

20. A method, comprising:
    splitting, using signal splitters, m modulated data streams into n copies each of which is delayed a respective amount to form n distinct orbital angular momentum (OAM) radio frequency (RF) mode signals;
    combining the OAM RF signals at respective signal combiners; and
    transmitting the distinct OAM RF signals into free space using an antenna array.

* * * * *